(12) United States Patent
Levy et al.

(10) Patent No.: US 8,665,447 B2
(45) Date of Patent: Mar. 4, 2014

(54) ENHANCED SENSITIVITY INTERFEROMETRIC SENSORS

(75) Inventors: Ronen Levy, Tel Aviv (IL); Shlomo Ruschin, Tel Aviv (IL)

(73) Assignee: Ramot at Tel Aviv University Ltd., Tel Aviv (IL)

( * ) Notice: Subject to any disclaimer, the term of this patent is extended or adjusted under 35 U.S.C. 154(b) by 371 days.

(21) Appl. No.: 13/055,464

(22) PCT Filed: Jul. 23, 2009

(86) PCT No.: PCT/IB2009/053200
§ 371 (c)(1),
(2), (4) Date: Apr. 6, 2011

(87) PCT Pub. No.: WO2010/010527
PCT Pub. Date: Jan. 28, 2010

(65) Prior Publication Data
US 2011/0188047 A1    Aug. 4, 2011

Related U.S. Application Data

(60) Provisional application No. 61/083,197, filed on Jul. 24, 2008.

(51) Int. Cl.
*G01B 9/02* (2006.01)
(52) U.S. Cl.
USPC .............................................. 356/477
(58) Field of Classification Search
USPC ............................................... 356/477
See application file for complete search history.

(56) References Cited

U.S. PATENT DOCUMENTS

| 4,659,923 A | 4/1987 | Hicks, Jr. |
| 5,064,270 A | 11/1991 | Turpin et al. |
| 5,218,419 A * | 6/1993 | Lipson et al. ............. 356/477 |

FOREIGN PATENT DOCUMENTS

GB          2311600          10/1997

* cited by examiner

*Primary Examiner* — Tarifur Chowdhury
*Assistant Examiner* — Omar Nixon
(74) *Attorney, Agent, or Firm* — Mark M. Friedman

(57) ABSTRACT

A sensor (10) and corresponding method for sensing variations in a parameter employ an optical device (12) defining two optical paths (14, 16) differentially affected by a variation in the parameter so as to change the differential phase between the two paths. This differential phase is monitored by a spectral interrogation arrangement (18) including a radiation input device (20) for delivering to the optical device (12) incident radiation at a plurality of wavelengths, and a reading arrangement (22) for measuring the interference-modulated optical output. The optical device (12) is configured so that the two optical paths have differing dispersion properties such that a difference between the phase accumulated by light propagating along the optical paths as a function of wavelength exhibits a maximum or minimum at some wavelength designated $\lambda_{critical}$. The plurality of wavelengths employed by the spectral interrogation arrangement span a range of wavelengths including, or adjacent to, $\lambda_{critical}$.

20 Claims, 9 Drawing Sheets

FIG. 1A (PRIOR ART)  FIG. 1B (PRIOR ART)
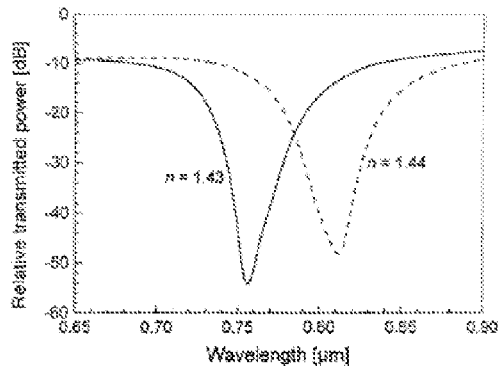
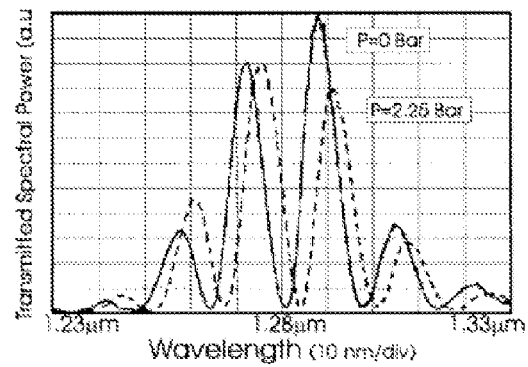
FIG. 2
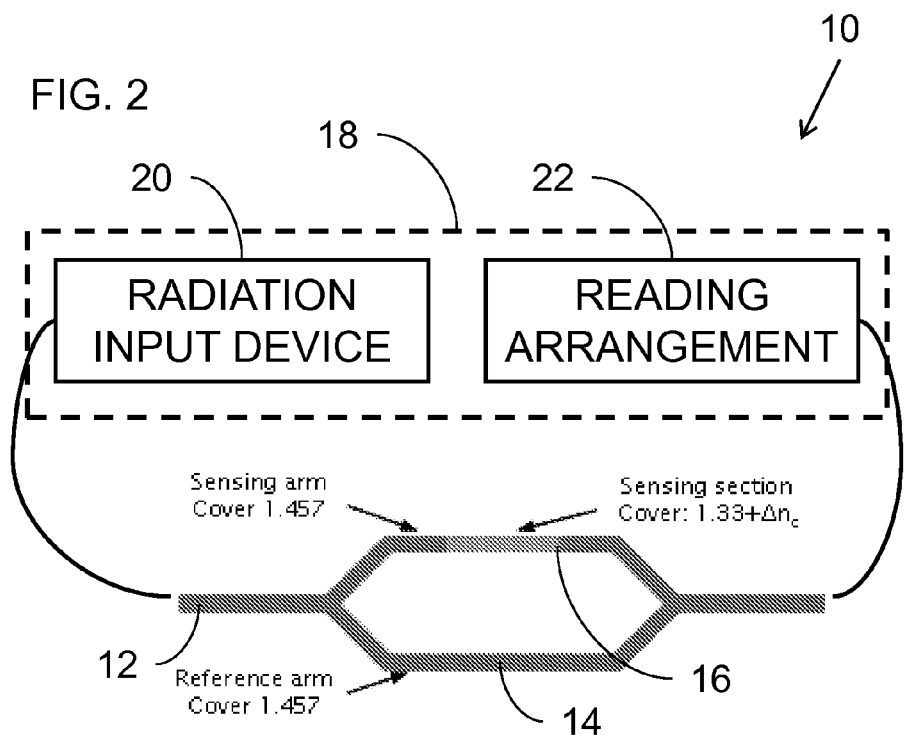

FIG. 15
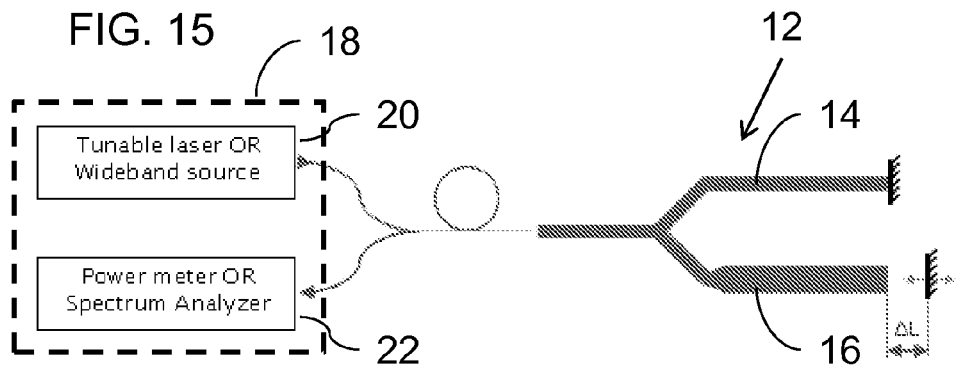
FIG. 16A
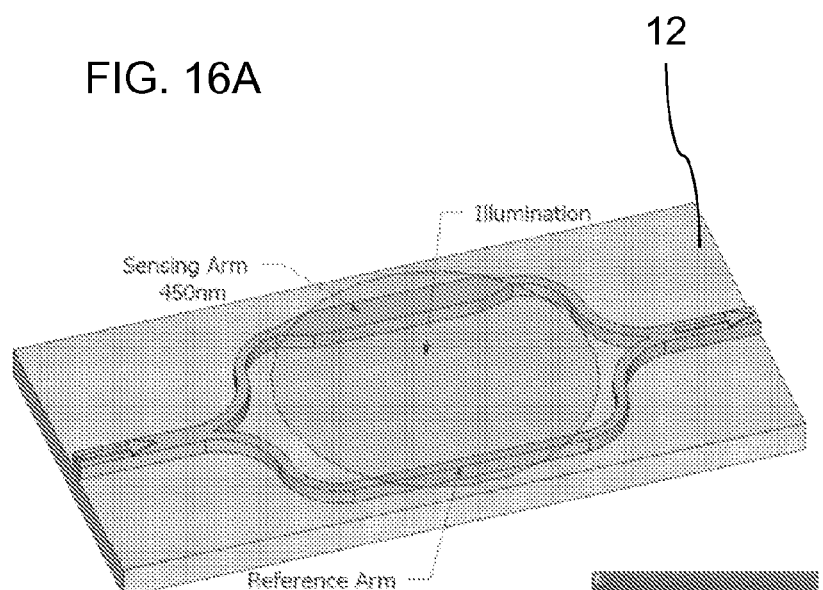
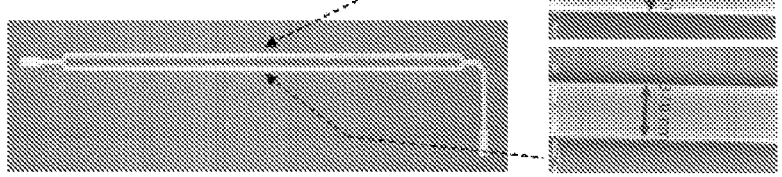
FIG. 16B    FIG. 16C

ENHANCED SENSITIVITY INTERFEROMETRIC SENSORS

FIELD AND BACKGROUND OF THE INVENTION

The present invention relates to optical devices and, in particular, it concerns hetero-modal interferometer optical sensors using spectral interrogation.

Optical evanescent-wave sensors in various forms have been exploited for highly sensitive chemical-biological sensing. Of these sensors, optical interferometric sensors utilize differential phase based detection for high sensitivity sensing. These sensors require a reference wave to mix with the signal in order to translate phase changes into detectable intensity changes. The reference can be provided in different ways with the most common being the dual-arm system used in the Mach-Zehnder configuration. Single channel multi mode waveguide interferometric sensors have also been reported, where the two paths pass along the same waveguide but in different propagation modes. This approach allows phase sensing without requiring a reference leg, and thus offers high sensitivity while maintaining the compactness and simplicity of a single channel waveguide. The use of modal interferometry was also reported in fiber sensors using circular, elliptical and photonic crystal multimode fibers with two or more propagating modes.

Different detection methods for optical sensors have been reported including intensity, phase, coupling angle, and spectral interrogation. Of these methods, spectral interrogation sensors use a broad bandwidth light source or a tunable laser, and detect variations in the sensed material by measuring changes in the wavelength dependence of the transfer power function induced by the sensing process. This method is widely used with many optical sensors configurations such as prism coupler-based surface plasmon resonance (SPR) sensors (Kretschmann configurations), grating-based sensors, waveguide SPR sensors, fiber sensors, and unbalanced Mach-Zehnder interferometer (MZI) based sensors. FIGS. 1A and 1B show examples the wavelength shift using spectral interrogation in conventional sensors: an SPR sensor (FIG. 1A) and unbalanced MZI sensor (FIG. 1B).

The sensitivity of sensing by spectral interrogation is determined by the wavelength shift $\Delta\lambda$ of features in the transfer power function corresponding to a change in the measured parameter. It would therefore be advantageous to provide sensors and corresponding methods of sensing with enhanced wavelength shift $\Delta\lambda$ of features in the transfer power function, thereby enhancing sensitivity of the sensor.

SUMMARY OF THE INVENTION

The present invention is an optical sensor and corresponding method for sensing variations in a parameter.

According to the teachings of the present invention there is provided, a sensor for sensing variations in at least one parameter, the sensor comprising: (a) an optical device defining two optical paths, at least one of the optical paths being deployed so that the phase accumulated by light propagating along the optical path is affected by a variation in the parameter, the optical paths being arranged to be fed by a common light source and recombining to generate an interference-modulated optical output; and (b) a spectral interrogation arrangement including a radiation input device for delivering to the optical device incident radiation at a plurality of wavelengths, and a reading arrangement for measuring the interference-modulated optical output, wherein the optical device is configured such that the two optical paths have differing dispersion properties such that a difference between the phase accumulated by light propagating along the optical paths as a function of wavelength exhibits a maximum or minimum at some wavelength designated $\lambda_{critical}$, and wherein the plurality of wavelengths span a range of wavelengths including, or adjacent to, $\lambda_{critical}$.

There is also provided according to the teachings of the present invention, a method for sensing variations in at least one parameter, the method comprising the steps of: (a) providing an optical device defining two optical paths, at least one of the optical paths being deployed so that the phase accumulated by light propagating along the optical path is affected by a variation in the parameter, the optical paths being arranged to be fed by a common light source and recombining to generate an interference-modulated optical output; and (b) performing spectral interrogation of the optical device by delivering to the optical device incident radiation at a plurality of wavelengths and measuring the interference-modulated optical output, wherein the optical device is configured such that the two optical paths have differing dispersion properties such that a difference between the phase accumulated by light propagating along the optical paths as a function of wavelength exhibits a maximum or minimum at some wavelength designated $\lambda_{critical}$, and wherein the plurality of wavelengths span a range of wavelengths including, or adjacent to, $\lambda_{critical}$.

According to a further feature of the present invention, the optical paths are spatially separated.

According to a further feature of the present invention, the two optical paths pass along first and second waveguides, respectively.

According to a further feature of the present invention, at least part of the first waveguide differs from the second waveguide in transverse dimension.

According to a further feature of the present invention, at least part of the first waveguide differs from the second waveguide in optical properties of a core material.

According to a further feature of the present invention, at least part of the first waveguide differs from the second waveguide in optical properties of a cladding material.

According to a further feature of the present invention, the optical device is an Mach-Zehnder interferometric sensor.

According to a further feature of the present invention, the optical device is a Michelson interferometric sensor.

According to a further feature of the present invention, the optical paths are provided by different modes of propagation passing along a single multi-modal waveguide.

According to a further feature of the present invention, the optical device is configured such that, for at least some value of the measured parameter, a phase difference between the optical paths at $\lambda_c$ substantially equals a multiple of $\pi$.

According to a further feature of the present invention, the spectral interrogation arrangement is configured to generate the plurality of wavelengths so as to span a range of wavelengths including $\lambda_{critical}$.

BRIEF DESCRIPTION OF THE DRAWINGS

The invention is herein described, by way of example only, with reference to the accompanying drawings, wherein:

FIG. 1A is a graph, discussed above, illustrating a transfer power spectrum of a wavelength interrogated SPR sensor according to the teachings of the prior art;

FIG. 1B is a graph, discussed above, illustrating a transfer power spectrum of a wavelength interrogated unbalanced MZI sensor according to the teachings of the prior art;

FIG. 2 shows a schematic representation of a hetero-modal Mach-Zehnder interferometer (MZI) sensor used to illustrate an aspect of the present invention;

FIG. 15 is a schematic representation of a waveguide-based Michelson interferometer displacement sensor according to an aspect of the present invention;

FIG. 16A is a schematic representation of an integrated MZI sensing configuration used to demonstrate an aspect of the present invention;

FIG. 16B is an electron micrograph illustrating an implementation of the sensing configuration of FIG. 16A;

FIG. 16C is an enlarged view of a portion of FIG. 16B; and

DESCRIPTION OF THE PREFERRED EMBODIMENTS

Figure 3A:
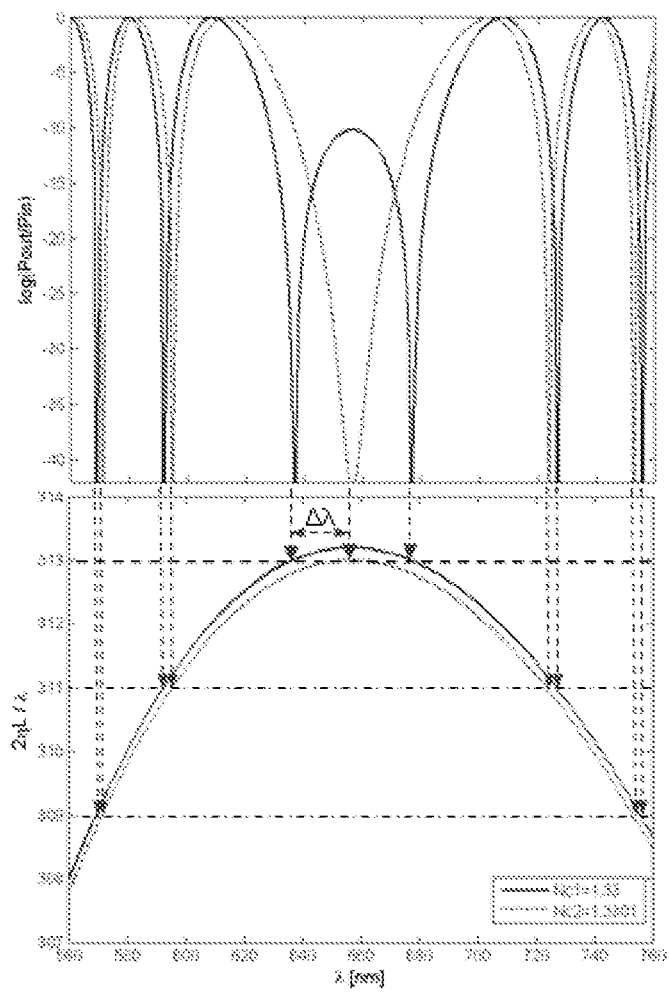
FIG. 3A is a pair of graphs, shown with a common horizontal axis corresponding to interrogation wavelength, illustrating a calculated transfer power, $P_{out}/P_{in}$ (top) and a calculated differential phase—$2L(n_{\mathit{eff-i}}-n_{\mathit{eff-j}})/\lambda$ (bottom) for the sensor of FIG. 2 for two values of sensed material refractive index $n_{c1}$=1.33 and $n_{c2}$=1.3301, corresponding to a theoretical calculated sensitivity of above 200,000 nm/RIU around $\lambda$=656 nm.

The present invention is an optical sensor and corresponding method for sensing variations in a parameter.

The principles and operation of sensors and methods according to the present invention may be better understood with reference to the drawings and the accompanying description.

By way of introduction, the present invention relates to interferometric sensors. In general, interferometric sensors employ an optical device which defines two optical paths, where at least one of the optical paths is deployed so that the phase accumulated by light propagating along the optical path is affected by a variation in a parameter to be measured. The optical paths are fed by a common light source and the light from the two paths is then combined to generate an interference-modulated optical output. Parenthetically, the term "light" in this context, and throughout the description and claims, is used to refer generically to all wavelengths of electromagnetic radiation commonly referred to as light, whether visible or invisible. Since the phase of light from at least one path varies as a function of the parameter to be measured, the interference-modulated optical output is also affected by the measured parameter. Examples of classes of interferometric sensors include, but are not limited to, sensors based on a configuration of: a Mach-Zehnder interferometer, a Michelson interferometer, a difference interferometer, a modal interferometer and some polarimetric sensors. The devices may be implemented in integrated waveguides, using optic fibers or, in some cases, using free-space optics. Measured parameters may be a wide range of physical, chemical or biological parameters, as is known in the art.

In many instances, the conventional approach to implementing interferometric sensors is to maintain similarity, to whatever degree is possible, between the two optical paths, thereby ensuring that the light reaching the output from the two paths has similar modes and amplitudes. Ideally, if the light emerging from the two paths is identical other than in phase, the dynamic range of the interference-modulated optical output is optimized, approaching full cancellation of the signal under out-of-phase conditions.

In certain cases, particularly where the two optical paths are implemented as different modes passing through the same waveguide (or fiber), the two paths inherently have dissimilar optical properties. The diverging optical properties of the two paths is in itself typically regarded as a disadvantage, although possibly outweighed by other design considerations such as the simplicity of structure achieved by use of a single waveguide. The use of paths with dissimilar optical properties has not previously been proposed as a feature that would facilitate enhanced sensor sensitivity.

By way of further introduction, the present invention relates to interferometric sensors which employ spectral interrogation techniques. Thus, generally speaking, the optical sensors of the present invention have a spectral interrogation arrangement including a radiation input device for delivering to the optical device incident radiation at a plurality of wavelengths, and a reading arrangement for measuring the interference-modulated optical output. The interrogation arrangement may be a tunable source which scans or steps between different wavelengths. In this case, the reading arrangement may be a simple power meter which detects the output power (or amplitude) for each input wavelength. Alternatively, a wideband or other multi-wavelength radiation source may be used. In this case, the reading arrangement is typically a spectrum analyzer. Spectral interrogation arrangements of both of these types are well known in the art, and are readily commercially available. The spectral extent of the wavelengths employed for spectral interrogation is referred to herein as the range "spanned" by the wavelengths used. Sensing of changes in the measured parameter is performed by identifying a wavelength shift $\Delta\lambda$ in features of the resulting power transfer spectrum for the sensor optical device, typically according to prior empirical calibration of the sensor. In each case illustrated below, the illustrated optical devices are used together with a suitable spectral interrogation arrangement including a radiation input device and reading arrangement. However, these standard components are omitted from most of the drawings for simplicity of presentation.

In the context of an interferometric sensor with spectral interrogation, an embodiment of the present invention employs an interferometric optical device configured such that the two optical paths have differing dispersion properties. In other words, implementation of the two paths is specifically chosen to have different optical properties so that the wavelength dependence of the refractive indices for the two paths differ. More specifically, the paths are implemented such that a difference between the phases accumulated by light propagating along the optical paths as a function of wavelength exhibits a maximum or minimum at some wavelength, referred to as the critical wavelength $\lambda_c$. As will be discussed in detail below, when this condition is satisfied, the critical wavelength has been found to correspond to a region of significantly enhanced sensitivity in the wavelength shift measured by spectral interrogation. The spectral interrogation arrangement is then employed to take measurements at a plurality of wavelengths across a range of wavelengths including, or adjacent to, the critical wavelength $\lambda_c$.

It will be noted that the teachings of the present invention may be implemented in a wide range of types of optical devices. In one set of particularly preferred embodiments, the optical paths are spatially separated, i.e., defined by distinct waveguide portions, fibers or geometrical paths in space. Examples of such devices include arrangements such as Mach-Zehnder interferometers and Michelson interferometers. In such cases, differing dispersion properties of the two paths can be achieved in a number of ways which will be clear to one ordinarily skilled in the art. Preferred examples include, but are not limited to: use of two waveguides where at least part of one waveguide differs from the other in transverse dimension (depth or width); use of two waveguides where at least part of one waveguide differs from the other in optical properties of a core material; use of two waveguides where at least part of one waveguide differs from the other in optical properties of a cladding material; and use of layered reflector structures in the two paths where the structure of the layers differs between the two paths.

In a further set of particularly preferred embodiments, the optical paths are provided by different modes of propagation passing along a single multi-modal waveguide.

Various examples of certain aspects of the invention, together with a theoretical analysis of those examples, will now be presented below with reference to FIGS. 2-15. Then, with reference to FIGS. 16A-17B, one non-limiting experimental example will be presented. It should be noted that any and all statements regarding mechanisms by which the invention is believed to work, or theoretical analysis based on such statements, are given merely for the purpose of facilitating an understanding of the invention and possible considerations which may be helpful to take into consideration when designing and implementing a device operating according to the present invention. However, the various aspects of the invention as described and claimed herein have been found to be of practical utility independent of the accuracy or otherwise of the theoretical analysis, and may be implemented according to the teachings of the present invention by empirical techniques, even if any part of the theoretical analysis were found to be in error.

Specifically, given a proposed optical device with differing dispersion properties for two optical paths, standard simulation software may be used to predict the differential phase of the output from the two paths for any given wavelength, and hence to determine whether the proposed device will exhibit a critical point as defined herein. The various design parameters can then be further modified by trial and error until a critical point is achieved, and to adjust the parameters of the critical point if necessary. The various specific examples offered herein, together with this simple trial and error design approach, is believed to provide a fully enabling disclosure for implementing a very wide range of devices and corresponding sensing methods according to the teachings of the present invention.

Analytic Calculation of the Critical Working Point and Resulting Sensitivity

In spectral interrogation of sensors, the output power is detected for different values of the source wavelength $\lambda$ within a given range. Following a small change in the surrounding parameters that change the mode propagation (e.g. cover bulk index of refraction or the addition or a thin layer on the top of the waveguide), the output power is scanned again as a function of the wavelength, and shifts in the spectral response are recorded. In many cases a shift is detected near a peak or a minimum in transmission. For SPR sensors, the wavelength shift is usually calculated as the shift of the minimum value of the output power—the SPR trough—and in an interferometric sensor the analysis can be done for the shift in the maximum or minimum value of the output power. If convenient, the shift can be measured at other points of the transmission curves e.g. the point of maximum slope as a function of wavelength (further discussed below).

Turning now to a specific example, namely, the sensing of changes in bulk refractive index of the media covering a waveguide. The spectral sensitivity of the measurement of a variation in the refractive index of cover bulk media is given in units of nm/RIU by:

$$\text{Sensitivity} = \frac{\Delta\lambda}{\Delta n_c} \quad (1)$$

Where $\Delta n_c$ is the bulk change in the sensed material refractive index (top layer) and $\Delta\lambda$ is the wavelength shift of the output power induced by the sensed material change. From a calculation point of view, the sensitivity as defined in (1), will converge to a definite value as $\Delta n_c$ approaches zero, unless a critical situation is encountered. In order to evaluate the wavelength change $\Delta\lambda$ we start by calculating the output power of the waveguide sensor. For an interferometric sensor in which the light propagates at the two paths within different modes, the output power will be given by:

$$P_{out} = \left| A_i e^{j2\pi L \frac{n_{eff\text{-}i}}{\lambda}} + A_j e^{j2\pi L \frac{n_{eff\text{-}j}}{\lambda}} \right|^2 \quad (2)$$
$$= |A_i|^2 + |A_j|^2 + 2|A_i A_j|\cos\left(2\pi L \frac{\eta}{\lambda}\right)$$

Where $n_{eff(i,j)}$ are the effective refractive indexes of each of the modes, $A_{i,j}$ are their corresponding amplitudes, L is the length of the two arms of the interferometer which are assumed equal in order to simplify the calculations (unequal length is discussed below), $\lambda$ is the source wavelength, and $\eta$ is the refractive index difference, namely $\eta = n_{eff\text{-}i} - n_{eff\text{-}j}$.

The wavelength of a peak can be found by calculating the derivative of the transfer power with respect to $\lambda$. Assuming that the amplitude of the modes is invariant to changes in $\lambda$ at the vicinity of the working point, peaks (minimum and maximum) in transfer power are given by:

$$\Phi(\lambda, n_c) = 2\pi L \frac{\eta(\lambda, n_c)}{\lambda} = N\pi; \quad (3)$$
$$N = 1, 2, 3 \ldots$$

Where the phase difference function $\Phi$ was defined. An odd value for N will correspond to a minimum, and an even value to a maximum.

Using implicit function differentiation and assuming: $\partial\Phi(\lambda,n_c)/\partial\lambda \neq 0$ at the working wavelength $\lambda$, the sensitivity (1) can be expressed as a function of $\eta$, $\lambda$, and $n_c$ under the constraint of a common phase difference $\Phi$ to give.

$$\text{Sensitivity} = \frac{\partial\lambda}{\partial n_c} \quad (4)$$
$$= \frac{\partial\Phi(\lambda, n_c)/\partial n_c}{\partial\Phi(\lambda, n_c)/\partial\lambda}$$
$$= \frac{\partial\eta(\lambda, n_c)}{\partial n_c} \bigg/ \left(\frac{\eta(\lambda, n_c)}{\lambda} - \frac{\partial\eta(\lambda, n_c)}{\partial\lambda}\right)$$

Examination of (4) show the possibility of a divergence in the sensitivity, i.e. the sensitivity tends to infinity when the denominator in (4) approaches zero. Explicitly, this condition is reached at a critical working point where the differential phase $\Phi(\lambda,n_c)$ has a peak with respect to wavelength changes. This peak will occur at:

$$\frac{\partial}{\partial\lambda}\frac{\eta}{\lambda} = 0 \rightarrow \frac{\partial\eta}{\partial\lambda} = \frac{\eta}{\lambda} \quad (5)$$

Provided that such an extremum point exists, this critical condition defines a critical wavelength $\lambda_{critical}$ for any given value of $n_{c*}$ and a divergence in spectral sensitivity will be attained. One should observe however that the critical condition (5) is independent of the value of N, and furthermore holds even if the phase difference does not equal $N\pi$—equation (3). If in addition the phase difference obeys (3), namely:

$$\eta = \frac{\lambda_{critical} N}{2L}; \quad (6)$$
$$N = 1, 2, 3 \ldots$$

Then a peak in power transfer will hold for both measurements before and after the change in $n_c$, and a peak splitting effect will take place as depicted in FIG. 1. Observe that the fulfillment of such involves the need for accurate length determination a problem which can be solved by temperature control or alleviated by a phase-tuning mechanism as further discussed below.

In the following, we derive explicit approximate expressions for the spectral sensitivity close to the critical point. The approximation is based on replacing the actual phase difference curve by a parabola with the same curvature at the peak of that curve as a function of wavelength. In addition, the phase difference function is assumed to be linear to changes in the refractive index $n_c$ at the working point vicinity. These two assumptions lead to the definition of the following constants:

$$\alpha = 0.5 \frac{\partial^2}{\partial\lambda^2}\left(\frac{\eta}{\lambda}\right) \quad (7)$$

$$\beta = \left[\frac{\partial\eta(n_c, \lambda_{critical})}{\partial n_c}\right] \quad (8)$$

Based on these definitions and assumptions, the sensitivity for a working wavelength $\lambda \neq \lambda_{critical}$ can be evaluated using equation (4) to give:

$$\text{Sensitivity} = \frac{\partial\lambda}{\partial n_c} \cong \frac{\beta}{2\lambda_{critical}\alpha(\lambda_{critical} - \lambda)} \quad (9)$$

Or in terms of $n_c$ ($n_c \neq n_{critical}$):

$$\text{Sensitivity} = \frac{\partial\lambda}{\partial n_c} \cong \frac{1}{2}\sqrt{\frac{\beta}{\lambda_{critical}\alpha(n_{critical} - n_c)}} \quad (10)$$

Where $n_{critical}$ is linked to $\lambda_{critical}$ by the requirement of unchanged reference phase.

The sensitivity at the critical working point ($\lambda = \lambda_{critical}$, $n_c = n_{critical}$) can be calculated non differentially, leading to the same results as (10) without the ½ factor (the difference is due to the non differential calculation).

From the discussion above it should be clear that a sufficient condition to observe critical conditions for the sensitivity is the existence of an extremum point in the differential phase, or equivalently in the factor $\eta/\lambda$ as a function of the wavelength. This situation is not uncommon and two examples are solved explicitly in the next section with results matching the analytic solution. Further examples of heteromodal interferometers exhibiting critical behavior are discussed below.

It is important to note the difference between the heteromodal interference sensor disclosed here, and a conventional length-unbalanced Mach-Zehnder interferometer. "Conventional" in this context refers to a case where the waveguides of the two arms are essentially identical, supporting similar modes of propagation. In this case, the dispersive properties of the two paths are typically very similar and no extremum of differential phase constant as a function of wavelength will typically be exhibited in the working range.

The sensitivity equation (9) assumes that the only mechanism changing the differential phase is attributed to the sensing process. If the phase function undergoes an additional change $\Delta\phi$, the expression for the sensitivity will be:

$$\text{Sensitivity} = \left[\frac{\beta}{\lambda_{critical}\alpha}(n_c - n_{critical}) + \frac{\Delta\varphi}{2\pi\alpha L}\right]^{1/2} / (n_c - n_{critical}) \quad (11)$$

If $\Delta\phi$ has a predictable value, the residual phase will just cause the re-evaluation of $\lambda_{critical}$. On the other hand, if $\Delta\phi$ has time fluctuations or noise, this noise will set the ultimate limit in sensitivity of the sensor.

NUMERICAL EXAMPLES

As a first example, a single mode Mach Zehnder interferometer is designed and numerically simulated, as illustrated in FIG. 2. Specifically, referring to numbering which will be maintained by analogy throughout the following description of various embodiments of the invention, there is shown a sensor 10 which includes an optical device 12 including two optical paths 14 and 16. The configuration of optical device 12 per se is very common for sensing, and is usually operated at the intensity or power interrogation mode. In this case, sensing is performed by a spectral interrogation arrangement 18 which includes a radiation input device 20 and a reading arrangement 22.

The device is based on $SiO_2$ as substrate and cover layer (n=1.457), and $Si_3N_4$ as guiding layer (n=2.0) with thickness of 100 nm (this waveguide without the cover layer is based on reference). The cover layer is removed at the sensing section, where the sensed material is placed. It is assumed here that the device is formed with a $SiO_2$ (n=1.457) substrate and cover, and a $Si_3N_4$ guiding layer (n=2.0, thickness 100 nm). The cover layer is removed at the sensing section where the sensed material is placed.

Figure 3B:
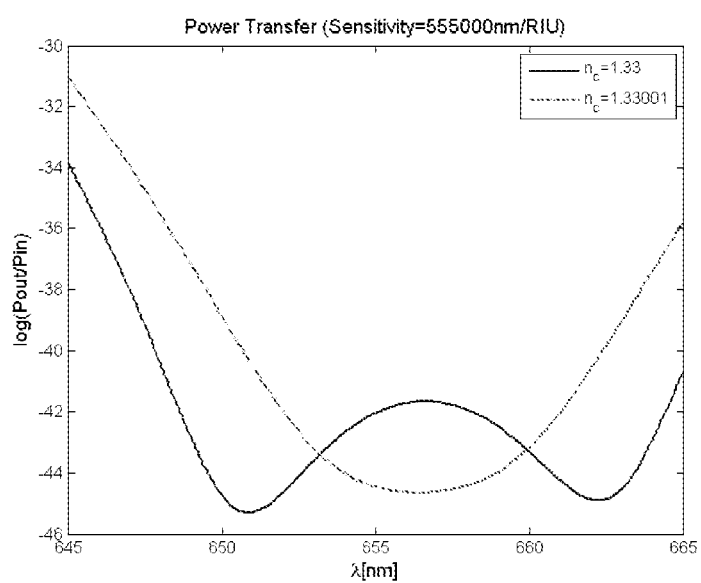
FIG. 3B is a graph illustrating a calculated transfer power, $P_{out}/P_{in}$ for the sensor of FIG. 2 for two values of sensed material refractive index $n_{c1}$=1.33 and $n_{c2}$=1.33001 ($\Delta n_c$= $10^{-5}$), corresponding to a theoretical calculated sensitivity of above 600,000 nm/RIU around $\lambda$=656 nm.

The following calculations correspond to the wavelength (spectral) interrogation mode and compare the expected spectral response at two situations: before and after the cover material at the sensing arm undergoes a change $\Delta n_c$. Parameters were chosen here to demonstrate a peak splitting effect, as will be discussed further below. In order to calculate the spectral sensitivity, the power transfer through the waveguide was found using the mode expansion and propagation method for different values of $\lambda$ (560-700 nm) and for two sensed material refractive indexes: $n_c$=1.33 and $n_c$=1.3301 (planar waveguide approximation was used, and a single polarization—TE—was assumed). The calculation of transfer power and normalized differential phase $2L\Delta n_{eff}/\lambda$ ($\pi$ was omitted to show the order N) for sensing section length of 4.04 mm are shown in FIG. 3A. The minima in the transfer power correspond to odd integer values of the differential phase in agreement with (3). Maximum spectral sensitivity is reached at the critical working point when the minimum output power matches the peak of the differential phase line as indicated by (6). The precise tuning of the differential phase can be achieved by control of the length, temperature, or by adding a differential phase to one of the legs. Calculated sensitivity, using (1), for this working point is above 200,000 nm/RIU for $\Delta n_c$=$10^{-4}$ (1.33-1.3301). For a smaller change in the sensed material refractive index: $\Delta n_c$=$10^{-5}$ RIU (1.33-1.33001), sensitivity values above 600,000 nm/RIU were calculated, as shown in FIG. 3B. It will be noted that the predicted curves are remarkably distinguishable, even for a small change in $n_c$. Not only is a shift of more than 5 nm noticeable, but two troughs in the graph appear instead of one (bifurcation point).

Figure 4A:
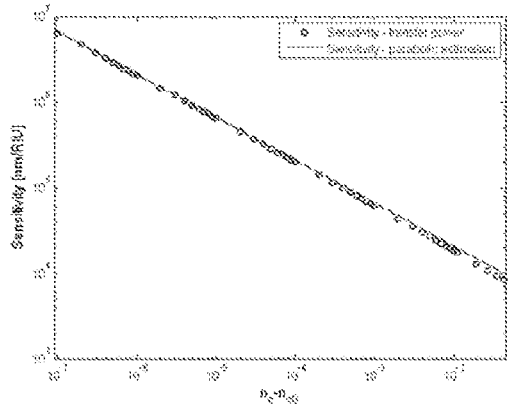
FIG. 4A is a graph illustrating calculated spectral sensitivity values for different values of $\Delta_c$ ($10^{-1}$-$10^{-9}$) for the device of FIG. 2, where the solid line shows the sensitivity using a first order approximation (equation 10, below), and the circles show the calculated sensitivity from the numerical transfer power calculations using equation (1), below, for $n_{c0}$=1.33.
Figure 4B:
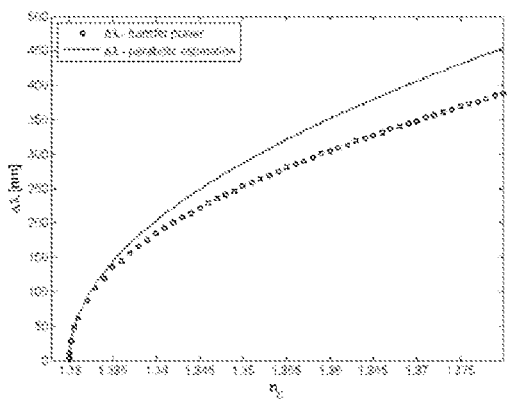
FIG. 4B is a graph illustrating the wavelength shift $\Delta\lambda$ against change in refractive index from an initial value of 1.33 for the device of FIG. 2.

For sensed material in aqueous environment, $n_c$=1.33, calculated values for this waveguide structure are $\lambda_{critical}$=657 nm, $\alpha$=$6*10^{-11}$ RIU/$nm^3$, and $\beta$=0.141. In addition to the above examples, the wavelength shift $\Delta\lambda$ and the sensitivity calculated for other values of $\Delta n_c$ (in the range of $10^{-1}$-$10^{-9}$) are shown in FIGS. 4A and 4B. The circles show the calculated sensitivity based on numerically evaluated transfer power—using (1)—and the solid line shows the calculation using the parabolic approximation—using (10). Both approaches fit well for small values of $\Delta n_c$. As seen, the sensitivity (FIG. 4A) and the slope of the wavelength shift $\Delta\lambda$ (FIG. 4B) approach infinity when the working point is close to the critical value. According to this graph, and based on wavelength resolutions of 0.0025 nm which have been described in the field, a theoretical resolution of $1.75*10^{-12}$ RIU can be predicted.

Calculations for a similar sensor in a channel waveguide structure, 200×200 nm embedded strip, show similar characteristics with slightly lower sensitivity values. A simulation was performed using the effective index mode or using Beam Propagation Method of the RSOFT BeamPROP™ package, commercially available from RSoft Design Group, Inc. (US).

Figure 5:
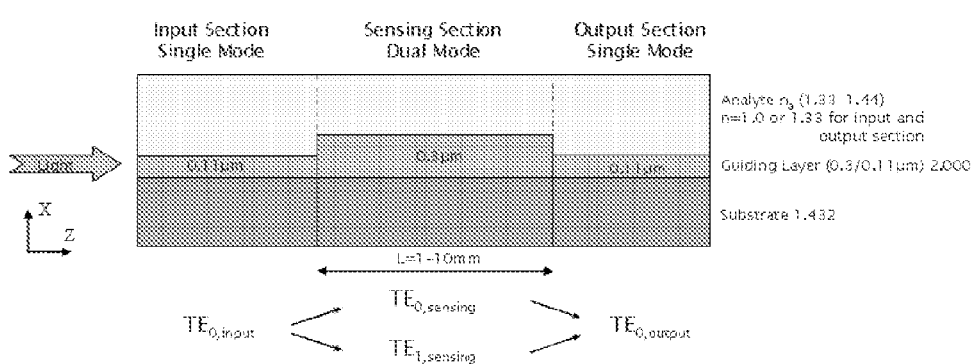
FIG. 5 a schematic representation of an interferometric waveguide structure supporting two guided modes $TE_0$ and $TE_1$ in the sensing section, used to illustrate an aspect of the present invention.

As a second example, a sensor using a single integrated optics waveguide structure supporting two guided modes is shown in FIG. 5. Light enters the system from the left to the single mode input section (only $TE_0$ is supported here assuming single polarization). At the first waveguide discontinuity, power is transferred to the sensing section into two guided modes ($TE_0$ and $TE_1$) where the sensing takes place—the phase of both modes is modified due to the changes in the sensed material. The two modes have different dispersion curves and different response to changes in bulk refractive index $n_c$. At the second discontinuity, the modes are combined and coupled into a single mode output section ($TE_0$), where interference takes place.

Calculated values for this sensor are $\lambda_{critical}$=616.2, $\alpha$=$1.85*10^{-9}$ RIU/$nm^3$ and $\beta$=0.119. For these values and for wavelength discrimination levels of 0.0025 nm, using (10), a theoretical resolution of $6*10^{-11}$ RIU can be predicted.

Sensor Length Considerations

As described above, the value of the nominal sensitivity near the critical point is independent of the length of the sensing section and furthermore critical sensitivity will be observed regardless the length. If it is further required that the two modes arrive with a definite phase difference at the end of the sensing section (e.g. a multiple of $\pi$ in order to observe a peak or trough splitting effect), then the length of the sensing section enters the expression of the phase difference between the modes (6), implying a relatively demanding fabrication constraint on the optical length. Active control of the differential phase between the two guided modes can be applied (temperature control is such an option in the general case) leading to reduction in fabrication constraints and adjustments inaccuracies (e.g. eliminating the length tight tolerances), a wider working range, and the optional deployment of phase modulation detection techniques. For the Mach Zehnder sensor, this can be done by actively changing the phase at one of the legs.

Modification of the Waveguide for Different Solutes

Figure 6A:
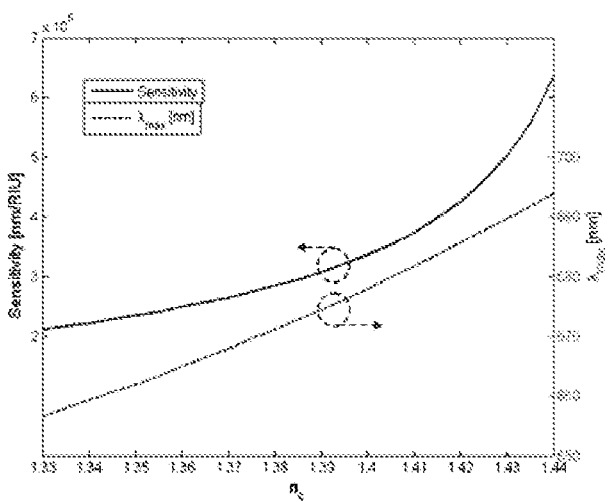
FIGS. 6A and 6B are graphs showing the variation of critical wavelength ($\lambda_{critical}$) and spectral sensitivity calculated for different values of solute refractive index $n_c$ ($\Delta n_c$=$10^{-5}$) for the devices of FIGS. 2 and 5, respectively.
Figure 6B:
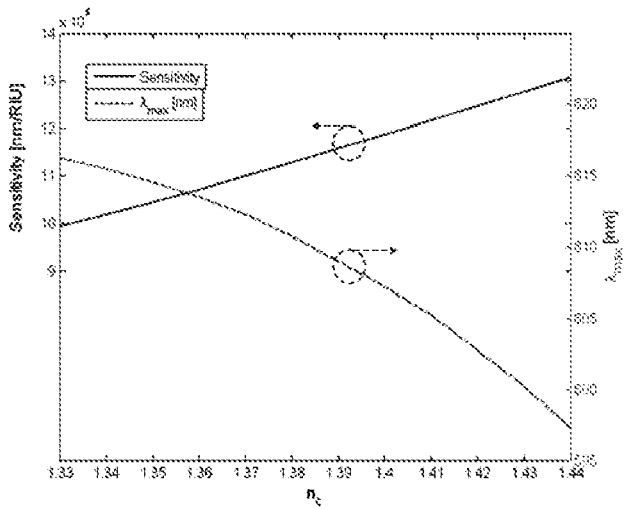

The above examples are for sensed material in aqueous environment ($n_c=1.33+\Delta n_c$) however, the same waveguide structure may also be used to sense solutes at a range of different refractive indexes without any modifications to the waveguide structure (only the critical wavelength will change). Both sensors described above can operate with solute refractive index of 1.33-1.44. The central wavelength ($\lambda_{critical}$) and the sensitivity for different values of solute refractive index $n_c=1.33$-$1.44$ ($\Delta n_c=10^{-5}$) are shown in FIGS. 6A and 6B, for the Mach-Zehnder example and single channel device, respectively. With increasing solute refractive index the sensitivity of both sensors increases.

Modification of the Critical Wavelength

For the above examples, the calculated $\lambda_{critical}$ were 650 nm and 616 nm for the devices of FIGS. 2 and 5, respectively. In many application cases, the working range of wavelengths is fixed and dictated for example by a given laser source. This value can be modified to accommodate source requirements by scaling the waveguide parameters. For example, increasing the thickness of the wave guiding layer increases $\lambda_{critical}$. For the above example, calculations show that, with increasing wavelength of the critical point, the sensitivity of the device will also increase.

Sensor Calibration

As discussed above, the sensitivity of the sensor around the critical working point is not linear and calibration is required in order to know the sensitivity parameters and the exact working point (wavelength) on the sensitivity graph. According to equation (9), the sensitivity of the sensor close to the critical point has a functional form:

$$\frac{\partial \lambda}{\partial n_c} \cong \frac{C}{(\lambda_{critical} - \lambda)} \tag{12}$$

The determination of the sensitivity within the parabolic approximation needs therefore the knowledge of two parameters, namely $\lambda_{critical}$ and C. The first parameter is readily determined from a single scan in wavelength, due to the symmetry of the transmission curve around that point. A second calibration scan for a known value of $\Delta n_c$ allows determination of the constant C.

Variations in Value of Critical Phase

Figure 7:
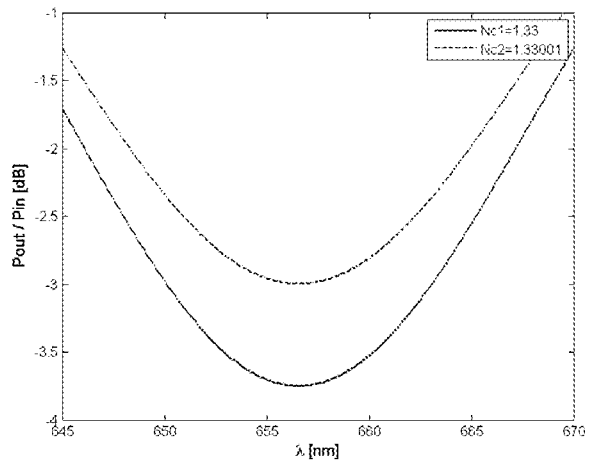
FIG. 7 is a graph showing transfer power calculated for differential phase of $\pi/2$ between the modes for a sensing section length L=10 mm.

In the examples analyzed above, the critical phase was constrained to the value of $\pi N$ in equation (3). When this condition is fulfilled concurrently with the critical condition (5), a drastic change in character of the spectral dependence of the transmission is observed (a peak splitting effect). If the critical phase is set to a different value and the critical condition (5) is obeyed, the power transmission will still have an extremum point at that phase value. This condition can be fulfilled by any given phase, since its value cancels in the derivation of the condition. The splitting effect will however not occur if the phase difference is not close to an integer times $\pi$. As a result the divergence in sensitivity and the expressions for enhanced sensitivity near this point—equations (9) and (10)—will still hold, but the change in the sensitivity will be expressed in the graph as a widening of the peak. FIG. 7 shows an example of the output power calculated for two values of sensed material refractive index $n_c=1.33$, $\Delta n_c=10^{-5}$ and for differential phase of $\pi/2$ between the modes (sensing section length L=10 mm). A widening or shift of the peak is clearly seen and can be used as a sensing measure at relatively higher output power. Again here, the working wavelength point can be chosen not exactly at $\lambda_{critical}$ but close to it, and expressions (9) and (10) will still hold.

Asymmetric Power Splitting

Figure 8A:
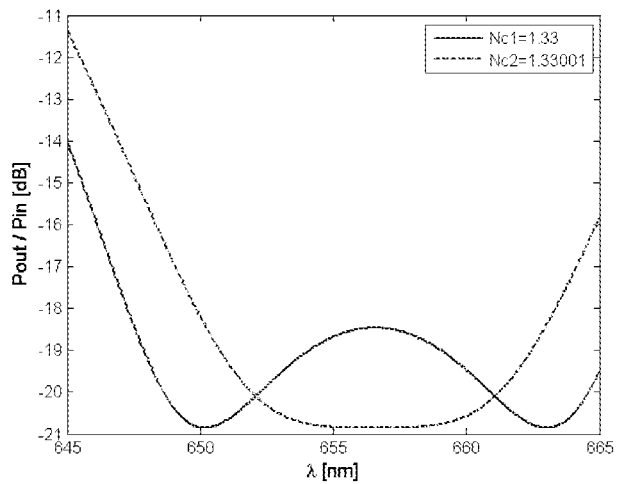
FIG. 8A is a graph showing calculated output power for the device of FIG. 2 with asymmetric power splitting between the modes: for $\Delta n_c$=$10^{-5}$ RIU, $\Delta\phi$=$\pi$, L=10 mm, $a_1$=1.2$a_2$, the output power is around −20 dB and the difference in output power at the peak, $\Delta P_{out}$, is 2.4 dB.
Figure 8B:
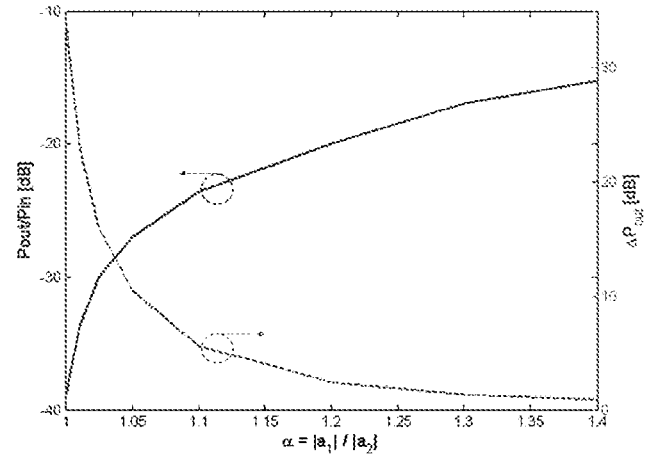
FIG. 8B is a graph showing output power and $\Delta P_{out}$ for different values of asymmetric splitting.

Another way to increase the output power at a minimum point is to split the input power asymmetrically between the modes. This method will decrease the dynamic range, but will increase the output power while keeping the sensitivity and the distinctive splitting of the single peak into two. For the MZI device of FIG. 2, for $\Delta n_c=10^{-5}$ RIU, $\Delta\phi=\pi$, L=10 mm, and for power splitting of $a_i=1.2a_j$ ($a_{i,j}$ are the amplitude of the modes), output power is about $-20$ dB and the difference in output power at the peak ($\Delta P_{out}$) is 2.4 dB as seen in the graph of FIG. 8A. The output power and $\Delta P_{out}$ for different values of asymmetric power splitting, are given in the graph of FIG. 8B.

Length-Unbalanced Interferometer

The above analysis related to a length-balanced interferometer where the two interfering legs had the same length: $L=L_1=L_2$ and $\eta=\Delta n_{eff}=n_{eff-i}-n_{eff-j}$. For a length-unbalanced interferometer where the two legs have different lengths: $L_1 \neq L_2$, the refractive index difference can be defined as $\eta_L = n_{eff-i} - (L_2/L_1)n_{eff-j}$ with $L=L_1$ at the phase difference definition (3).

The same analysis as done in the previous sections for the differential phase line (5) with $\eta_L$ instead of $\eta$ leads to:

$$\frac{\partial}{\partial \lambda}\left(\frac{\eta_L}{\lambda}\right) = 0 \rightarrow \left(1 - \frac{L_1}{L_2}\right)\frac{\partial}{\partial \lambda}\left(\frac{n_{effi}}{\lambda}\right) = \frac{\partial}{\partial \lambda}\left(\frac{\eta}{\lambda}\right) \tag{13}$$

Figure 9:
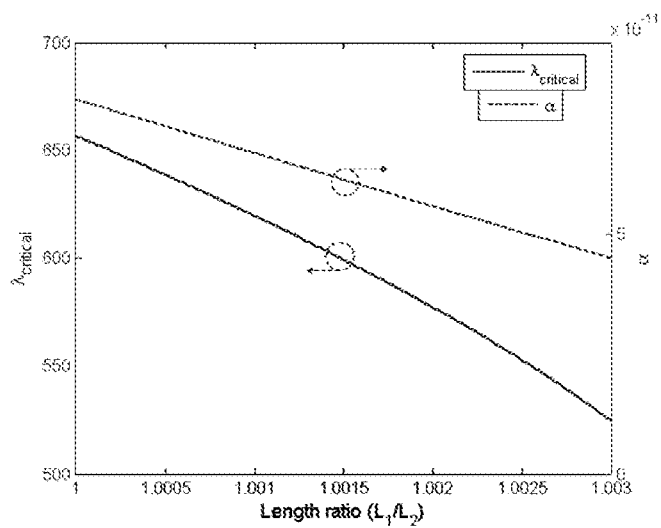
FIG. 9 is a graph showing critical wavelength ($\lambda_{critical}$) and parabolic curvature (a) calculated for different values of the length ratio ($L_1/L_2$) for the sensor of FIG. 2.

Following the above, the ability to change the length ratio of the interferometer legs adds further flexibility in design parameters that can be used to adjust $\lambda_{critical}$. In the same way, the sensitivity will depend on $\eta_L$ instead of $\eta$. A sample calculation for the MZI sensor of FIG. 2 for different values of the length ratio $L_1/L_2$ is shown in FIG. 9. In this case, both the critical wavelength ($\lambda_{critical}$) and the parabolic curvature ($\alpha$) decrease with increasing length difference ratio. For this example and in this range, the overall sensitivity increases when increasing the length ratio.

Generalization to Other Sensor Configurations

The principles of an embodiment of the present invention illustrated above may be applied to a wide range of different sensor types, each of which has its particular advantages or particularly suited applications. Common to a range of embodiments of the present invention is creation of a critical situation where the phase-difference function $\phi$ exhibits an extremum as a function of optical wavelength (equation (5) above), or equivalently, as a function of optical frequency (equation (14) below). In this situation, the theoretical limit of the sensitivity to changes in an additional parameter affecting the phase becomes infinite. For the case of FIG. 2 addressed above, the optical path differentiation was attained by means of a waveguided Mach-Zehnder configuration and the sensed parameter was the refractive index of the cover waveguide $n_c$. The same effect will take place in any other optical interferometric sensors using spectral interrogation cases, which support the validity of relationship for a definite value of the wavelength λ—equation (5) above or the more general equation:

$$\frac{\partial \Phi(\lambda, p_1, p_2, p_3, \ldots)}{\partial \lambda} = 0 \quad (14)$$

Where p1, p2, p3 ... are additional parameters on which the phase depends. Each of these parameters will be measured with enhanced sensitivity if the condition formulated in equation (14) is fulfilled. Examples of such parameters are: geometrical dimensions (including, but not limited to: accelerometers, displacement sensors, profilometers, optical microphones), refractive index (for example bio-chemical sensors), temperature, pressure, and external magnetic or electric fields eventually affecting the phase difference. The sensitivity in this case may be defined as:

$$\text{Sensitivity} = \frac{\partial \lambda}{\partial p} \quad (15)$$

Similarly to the proof presented in equations (3-5), this generalized sensitivity will experience a divergence at a wavelength for which equation (14) is fulfilled.

In order to provide enhanced sensitivity according to the teachings of an embodiment of the present invention, a sensor is preferably designed in order to operate in a range including, or adjacent to, the aforementioned extremum. In this context, "adjacent" to the critical point will be understood intuitively by one ordinarily skilled in the art as operation of the spectral interrogation close enough to the critical wavelength to obtain significantly enhanced wavelength sensitivity as taught herein. In numerical terms, "adjacent" to the critical point may be defined as within a range from the extremum such that the phase difference as a function of wavelength is significantly non-linear, i.e., that the slope of that curve changes with wavelength by more than 1% per nanometer, or that the differential sensitivity (15) experiences a significant increase when approaching the critical wavelength. 'Significant increase' in this context means that the sensitivity changes by more than 1% per nm change in wavelength.

Figure 10:
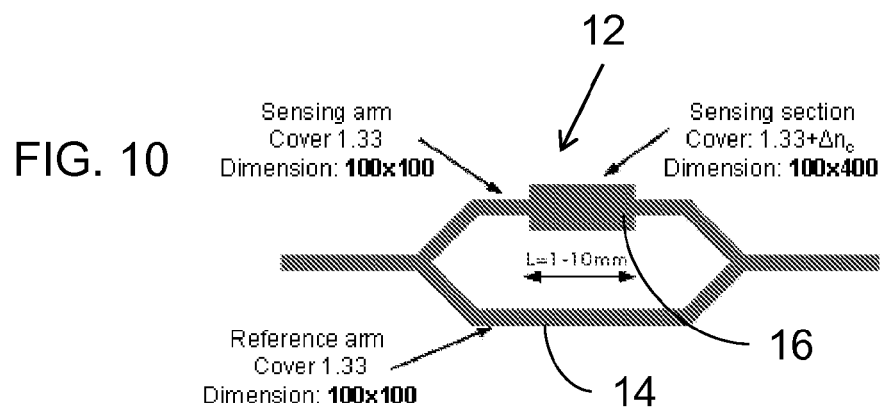
FIG. 10 shows a schematic representation of a hetero-modal Mach-Zehnder interferometer (MZI) sensor used to illustrate an aspect of the present invention, based on an embedded strip channel waveguide where the sensing section is wider in the Y-axis aspect.

As further examples of sensors where the critical conditions can be attained, other configurations were analyzed in a similar way to the above examples. In these cases, similar characteristics were found with a critical working point, the split of the minima, and the accompanying divergence in sensitivity. Sample additional examples include, but are not limited to:

A Mach Zehnder interferometer sensor where the sensing section is wider in the Y-axis aspect, illustrated schematically in FIG. 10. An embedded strip channel waveguide was used with thickness of 100 nm and a width in the Y-axis of 400 nm in the sensing section and 100 nm in the rest of the sensor (assuming a SiO$_2$ substrate with n=1.457 and a Si$_3$N$_4$ guiding layer with n=2.0).

Figure 11A:
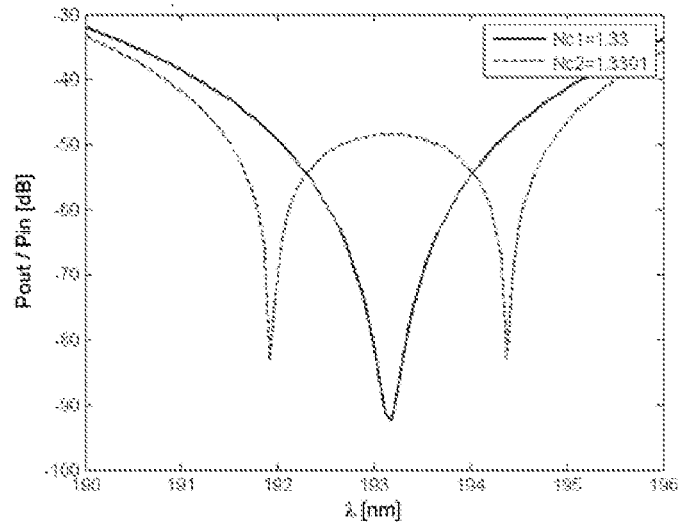
FIGS. 11A and 11B illustrate output power and differential phase line, respectively, for the sensor of FIG. 10, where a minimum in the differential phase line corresponds to a split in the transfer power.
Figure 11B:
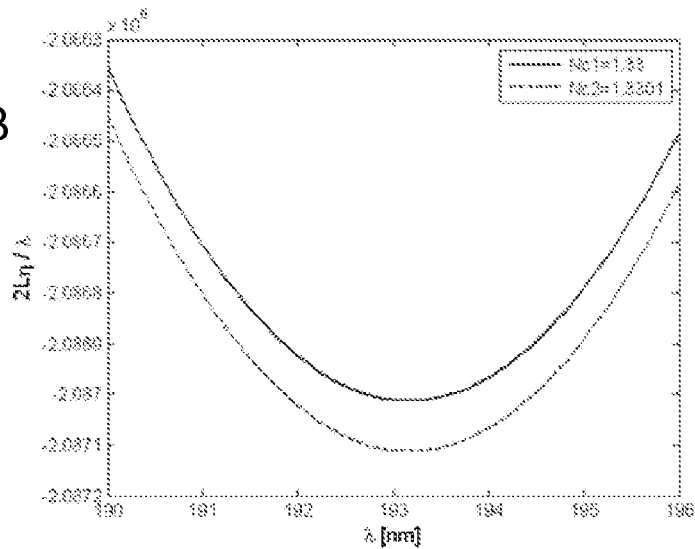

In contrast to the previous examples, with this sensor structure, an increase in the sensed material refractive index (n$_c$=1.33+Δn$_c$) presents an increase in the refractive index difference |η| and the differential phase line shows a minimum at the critical wavelength as seen in the graph of FIG. 11B. A single peak in the transfer power (e.g. at n$_c$=1.33) would be split into two peaks when the sensed material is added (e.g. at n$_c$=1.33+Δn$_c$) as seen in the graph of FIG. 11A.

Figure 12:
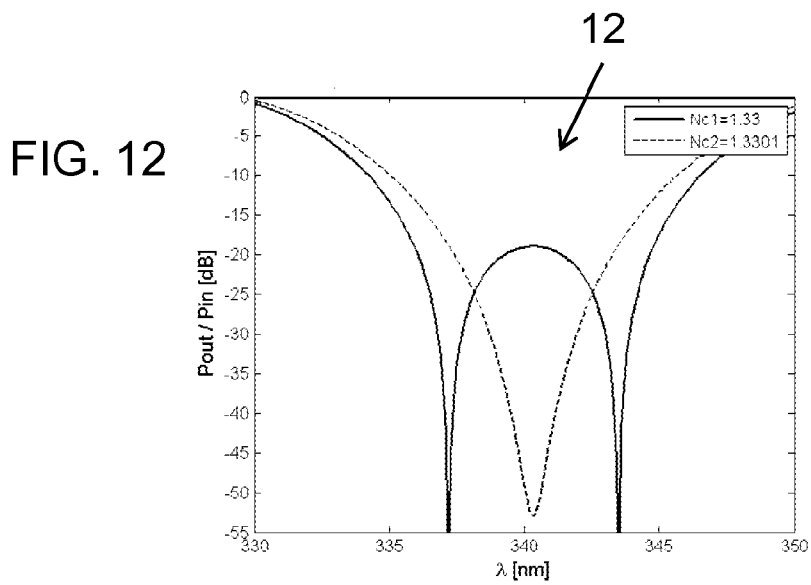
FIG. 12 illustrates the calculated power transfer for two different values of sensed material refractive index: 1.33, 1.3301 in a single channel interferometer sensor using interference of two modes of different polarizations: $TE_0$ and $TM_0$, illustrating splitting of the peak at the critical wavelength.

A single channel interferometer sensor using different polarizations: TE and TM. The two polarizations are used as the two interfering modes. Sensor parameters are the same as the sensing arm of the MZI example in FIG. 2. Output power calculated for two values of sensed material refractive index: 1.33 and 1.3301 shows the splitting of the peak around the critical working point as seen in FIG. 12.

Figure 13:
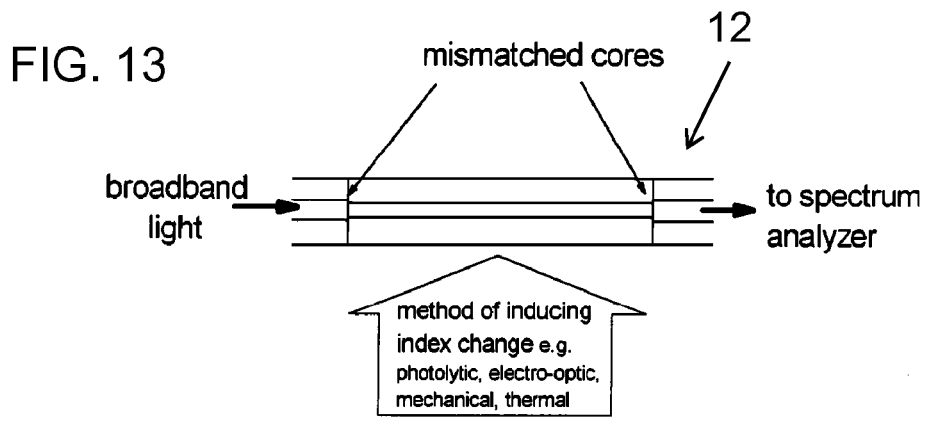
FIG. 13 is a schematic illustration of a fiber optic interferometric sensor supporting two guided modes which may be used as part of a sensor according to an aspect of the present invention.

A fiber optic interferometric sensor designed to support two guided modes—e.g. LP$_{01}$ and LP$_{11}$—where splitting and coupling is done by mismatched cores, as seen FIG. 13 taken from reference [3]. Calculations for the fiber sensor structure (fiber parameters not found in the reference were estimated to fit the transfer power graph there) show that the sensitivity can be greatly increased by changing the wavelength range to work close to the critical working point.

Figure 14:
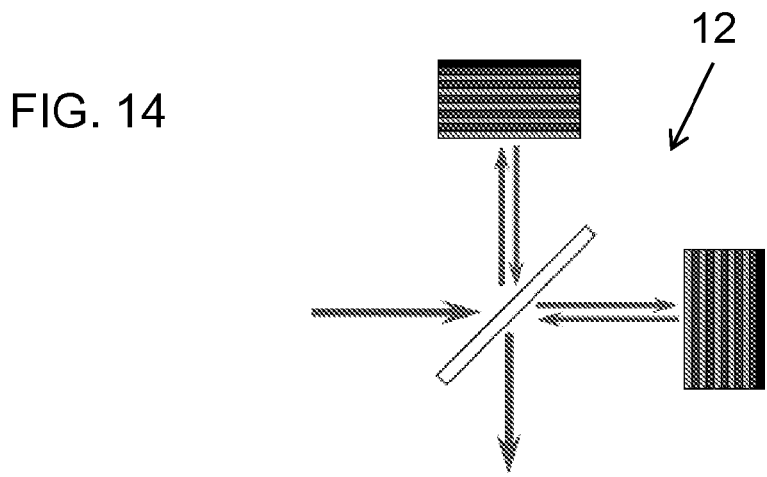
FIG. 14 is a schematic illustration of a Michelson interferometer with a different layered reflector structures at each leg, for use as part of a sensor according to a further aspect of the present invention.

A free-space Michelson interferometer sensor with a layered reflector or "stack" at each leg. The layers are slightly different between the legs, presenting a difference between the propagating modes and a peak in the differential phase function. For example, a Michelson interferometers with a stack layers of 5 repetitions of two 80 nm width layers: n$_1$=1.8, n$_2$=2.2 at one leg, and n$_1$=1.81, n$_2$=2.2 at the other leg is shown in FIG. 14. Changes to one of the layers types at one of the legs— e.g. n$_1$=1.8+Δn—results in a split in the output power and divergence in sensitivity.

An integrated Michelson interferometer can also be designed to operate at a critical working point. In order for the interfering modes to have different dispersion properties, the legs of the interferometer are preferably different. This can be achieved by changing the cladding of one of the legs (as was done for the MZI structure above) or by changing the width of one of the legs as shown in FIG. 15. If mirrors are placed at each end of the interferometer (right side of FIG. 15) and one of these mirrors is allowed to move, this move would change the differential phase between the two interfering modes. The interferometer can be designed to operate close to the critical working point leading to a highly sensitive integrated optical sensor for different applications such as displacement sensor, accelerometer, profilometer, or optical microphone.

In contrast to the above examples, an example of a configuration where the critical working point does not exist is an unbalanced Mach-Zehnder based sensor where the only difference between the reference and sensing legs is the length. The interfering modes and their dispersion curve will be the same and the differential phase constant line η/λ would not exhibit a peak for wavelength changes.

Phase modulation, frequency modulation, and numerical extrapolation techniques may be further used to enhance measurement accuracy and increase sensitivity.

Experimental Example

A Mach Zehnder interferometer was fabricated on a silicon waveguide structure (see FIGS. 16A-16C), analogous to the model used for calculations described in FIG. 10 above. The measured waveguide interferometer was realized on the basis of a Silicon-On-Insulator (SOI) substrate. Electron-beam lithography was used to define the waveguide structures followed by reactive-ion etching to transfer the patterns. The silicon layer was 220 nm thick, the interferometer arms length were 2 mm, and after etching, the structure was coated with SU8 polymer to form a top cladding layer. The interferometer was designed to have different channel widths for the sensing and the reference arms—450 nm and 370 nm respectively. This difference in widths causes a difference in the modal propagation constants and was designed so that equation (5) is fulfilled for the basic mode, and the proper wavelength is accessible for a given source. In the present case, this means that the differential phase between the modes showed a peak (around 1550 nm) within the scanned wavelength of an available tunable laser source with a working range of 1515-1600 nm. Light was coupled in and out the device by means of lensed optical fibers and its polarization was controlled to fit the TE waveguide mode. In order to emulate the sensing process, the device was illuminated from above by a second laser ($\lambda$=809 nm, P=120 mW). This illumination induces small changes in the refractive index of the silicon waveguides. Due to experimental constraints, the illuminating spot in our experiment covered both waveguides (sensing and reference), and the difference in effective refractive indices induced by the illumination was due to the difference in widths between the two waveguides. Multiple measurements were taken alternately with and without illumination, averaged, and a simple numerical low pass filter was used on the measured data in order to reduce noise (mainly due to reflections at the chip's interfaces).

Figure 17A:
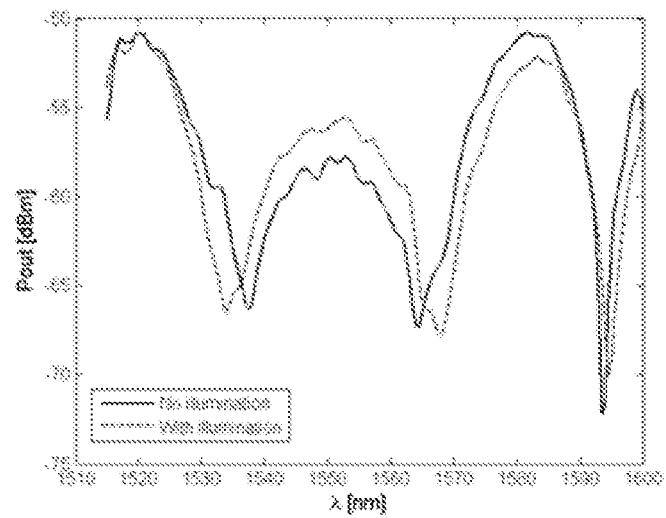
FIGS. 17A and 17B are graphs showing experimental results of power transfer as a function of wavelength with and without illumination, the graphs corresponding to two different operating temperatures.

The sensor output power at the scanned wavelength range is shown in FIG. 17A without illumination of the second laser (solid line) and with the illumination (dashed line). As seen in this figure, the troughs in the output power (corresponding to destructive interference) experience a shift following the laser illumination. In contrast to conventional sensing by spectral interrogation, the spectral shift of the dips or troughs are seen to shift in opposite directions, each shifting away from the critical wavelength. The dip on the left side (around 1535 nm) shifts left about 4 nm and the dip on the right side (around 1565 nm) shifts right about 4 nm. The last dip on the right (around 1595 nm) also shifts right, but only about 1 nm—illustrating the enhanced sensitivity which is achieved by operation of the sensor closer the critical working point. As the scanned output power clearly suggests, the sensitivity increases significantly when approaching the critical wavelength (~1550 nm).

In order to change the working point of the sensor (i.e. the position of the dips), temperature control was used to achieve active control of the differential phase between the two guided modes. Specifically, it was desired to bring the critical point phase difference close to an odd multiple of it in order to observe the predicted bifurcation effect at a trough. After heating, the critical working point was reached and a single peak is visible at the critical wavelength (solid line of FIG. 17B). When the perturbing illuminating laser is turned on, the output power spectrum shows a split of the dip, about 13 nm to each side, as seen in the dashed line. The right dip, farther away from the critical point (around 1590 nm) shows a much smaller shift.

Figure 17B:
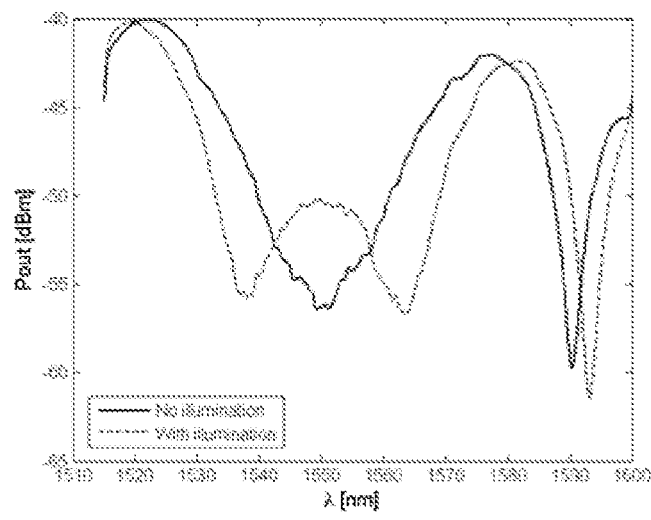

The acquired data of FIGS. 17A, 17B allows the estimation of the sensitivity achieved by this sensor and the potential resolution limit. First, the phase difference induced by the illumination is established using the recorded spectra and relying on the quadratic approximation, yielding $\Delta\phi$=0.4 radians, a result confirmed also by a full numerical simulation. This phase difference is due to the modal differences between the waveguides at the two arms, since the bulk silicon index changes induced by the illumination are assumed identical. Solving the modal equations, a laser-induced silicon index difference of $\Delta n$~0.0005 RIU is deduced. Considering that this change induced a peak splitting of 25 nm, a measured sensitivity of $5*10^4$ nm/RIU was attained. One can evaluate the potential sensitivity of this interferometer in a typical evanescent sensing situation. There, only one arm would be exposed to changes and the changes would take place in the cover layer of that waveguide. A modal numerical calculation yields a sensitivity of $2*10^5$ nm/RIU for the bulk cover refractive index. An evaluation of potential resolution in index changes can be also made around one of the dips (at 1535 nm or 1565 nm) and the ultimate resolution would depend on the accuracy of wavelength determination. Quoting reported values of 0.0015 nm, a resolution of $10^{-8}$ RN could be achieved at either working point. Further approaching the critical working point, this detection level could substantially improve.

Although the present invention is not limited to cases where this splitting effect occurs, it should be noted that certain preferred embodiments of the present invention use this splitting effect to advantage. For example, the splitting in wavelength can be used as a measuring parameter for sensing, instead of the conventionally required consecutive scans to determine a shift in absolute wavelength value. This fact avoids the need to perform reference scans and simplifies the stability requirement of the light source or the wavelength measuring equipment. Sensitivities demonstrated in this preliminary experiment are already in the range of state-of the art reported values for optical interferometer sensors. Sensitivity and noise reduction can be further improved by employing electronic wavelength scanning and demodulation techniques instead of the opto-mechanically tunable laser used here. Another option is to use a wideband optical source and scan the transmission spectrum in a spectrometer detector array. Phase locking can also be used to reduce noise, simplify detection, and increase operating range. The reported effects are actually generic and can be implemented for sensing a variety of parameters e.g. material composition changes, chemical and bio-chemical reactions, temperature, displacement, pressure end stress.

It will be appreciated that the above descriptions are intended only to serve as examples, and that many other embodiments are possible within the scope of the present invention as defined in the appended claims.

What is claimed is:

1. A sensor for sensing variations in at least one parameter, the sensor comprising:
   (a) an optical device defining two optical paths, at least one of said optical paths being deployed so that the phase accumulated by light propagating along the optical path is affected by a variation in the parameter, said optical paths being arranged to be fed by a common light source and recombining to generate an interference-modulated optical output; and
   (b) a spectral interrogation arrangement including a radiation input device for delivering to said optical device incident radiation at a plurality of wavelengths, and a reading arrangement for measuring said interference-modulated optical output,
   wherein said two optical paths pass along spatially-separated first and second waveguides, respectively, and wherein at least part of said first waveguide differs from said second waveguide in at least one property selected from the group consisting of transverse dimension, optical properties of a core material, and optical properties of a cladding material, such that said two optical paths have differing dispersion properties such that a difference between the phase accumulated by light propagating along said optical paths as a function of wavelength exhibits a maximum or minimum at some wavelength designated λcritical, and wherein said plurality of wavelengths span a range of wavelengths including, or adjacent to, λcritical.

2. The sensor of claim 1, wherein at least part of said first waveguide differs from said second waveguide in transverse dimension.

3. The sensor of claim 1, wherein at least part of said first waveguide differs from said second waveguide in optical properties of a core material.

4. The sensor of claim 1, wherein at least part of said first waveguide differs from said second waveguide in optical properties of a cladding material.

5. The sensor of claim 1, wherein said optical device is an Mach-Zehnder interferometric sensor.

6. The sensor of claim 1, wherein said optical device is a Michelson interferometric sensor.

7. The sensor of claim 1, wherein said optical device is configured such that, for at least some value of the measured parameter, a phase difference between said optical paths at $\lambda_{critical}$ substantially equals a multiple of π.

8. The sensor of claim 1, wherein said spectral interrogation arrangement is configured to generate said plurality of wavelengths so as to span a range of wavelengths including $\lambda_{critical}$.

9. A method for sensing variations in at least one parameter, the method comprising the steps of:
(a) providing an optical device defining two optical paths, at least one of said optical paths being deployed so that the phase accumulated by light propagating along the optical path is affected by a variation in the parameter, said optical paths being arranged to be fed by a common light source and recombining to generate an interference-modulated optical output;
(b) performing spectral interrogation of said optical device by delivering to said optical device incident radiation at a plurality of wavelengths and measuring said interference-modulated optical output,
wherein said two optical paths pass along spatially-separated first and second waveguides, respectively, and wherein at least part of said first waveguide differs from said second waveguide in at least one property selected from the group consisting of transverse dimension, optical properties of a core material, and optical properties of a cladding material, such that said two optical paths have differing dispersion properties such that a difference between the phase accumulated by light propagating along said optical paths as a function of wavelength exhibits a maximum or minimum at some wavelength designated λcritical, and wherein said plurality of wavelengths span a range of wavelengths including, or adjacent to, λcritical.

10. The method of claim 9, wherein at least part of said first waveguide differs from said second waveguide in transverse dimension.

11. The method of claim 9, wherein at least part of said first waveguide differs from said second waveguide in optical properties of a core material.

12. The method of claim 9, wherein at least part of said first waveguide differs from said second waveguide in optical properties of a cladding material.

13. The method of claim 9, wherein said optical device is configured such that, for at least some value of the measured parameter, a phase difference between said optical paths at $\lambda_{critical}$ substantially equals a multiple of π.

14. The method of claim 9, wherein said spectral interrogation arrangement is configured to generate said plurality of wavelength so as to span a range of wavelengths including $\lambda_{critical}$.

15. A sensor for sensing variations in at least one parameter, the sensor comprising:
(a) an optical device defining two optical paths, at least one of said optical paths being deployed so that the phase accumulated by light propagating along the optical path is affected by a variation in the parameter, said optical paths being arranged to be fed by a common light source and recombining to generate an interference-modulated optical output; and
(b) a spectral interrogation arrangement including a radiation input device for delivering to said optical device incident radiation at a plurality of wavelengths, and a reading arrangement for measuring said interference-modulated optical output,
wherein said optical paths are provided by different modes of propagation passing along a single multi-modal waveguide such that said two optical paths have differing dispersion properties such that a difference between the phase accumulated by light propagating along said optical paths as a function of wavelength exhibits a maximum or minimum at some wavelength designated λcritical, and wherein said plurality of wavelengths span a range of wavelengths including, or adjacent to, λcritical.

16. The sensor or claim 15, wherein said optical device is configured such that, for at least some value of the measured parameter, a phase difference between said optical paths at $\lambda_{critical}$ substantially equals a multiple of π.

17. The sensor of claim 15, wherein said spectral interrogation arrangement is configured to generate said plurality of wavelengths so as to span a range of wavelengths including λcritical.

18. A method for sensing variations in at least one parameter, the sensor comprising:
(a) providing an optical device defining two optical paths, at least one of said optical paths being deployed so that the phase accumulated by light propagating along the optical path is affected by a variation in the parameter, said optical paths being arranged to be fed by a common light source and recombining to generate an interference-modulated optical output; and
(b) performing spectal interrogation of said optical device by delivering to said optical device incident radiation at a plurality of wavelengths, and measuring said interference-modulated optical output,
wherein said optical paths are provided by different modes of propagation passing along a single multi-modal waveguide such that said two optical paths have differing dispersion properties such that a difference between the phase accumulated by light propagating along said optical paths as a function of wavelength exhibits a maximum or minimum at some wavelength designated λcritical, and wherein said plurality of wavelengths span a range of wavelengths including, or adjacent to, λcritical.

19. The method of claim 18, wherein said optical device is configured such that, for at least some value of the measured parameter, a phase difference between said optical paths at $\lambda_{critical}$ substantially equals a multiple of π.

20. The method of claim 18, wherein said spectral interrogation arrangement is configured to generate said plurality of wavelengths so as to span a range of wavelengths including λcritical.

* * * * *

UNITED STATES PATENT AND TRADEMARK OFFICE
CERTIFICATE OF CORRECTION

PATENT NO. : 8,665,447 B2
APPLICATION NO. : 13/055464
DATED : March 4, 2014
INVENTOR(S) : Ronen Levy et al.

It is certified that error appears in the above-identified patent and that said Letters Patent is hereby corrected as shown below:

In the Claims

Column 18

Claim 18, line 37 should be corrected as follows:
Change:
-- eter, the sensor comprising --
to
"eter, the method comprising the steps of:"

Claim 18, line 45 should be corrected as follows:
Change:
-- (b) performing spectal interrogation of said optical device --
to
"(b) performing spectral interrogation of said optical device"

Signed and Sealed this
Tenth Day of June, 2014

Michelle K. Lee
*Deputy Director of the United States Patent and Trademark Office*